Figure 1:
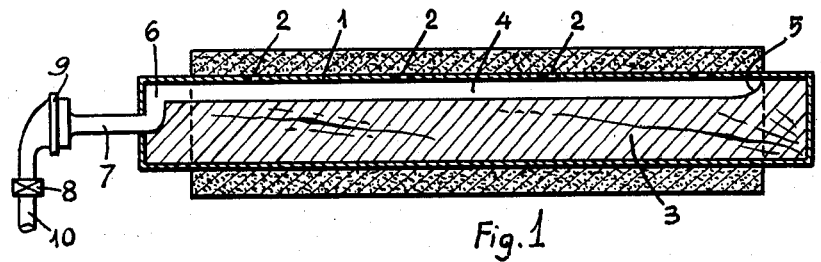

July 21, 1959 R. FOURMANOIT 2,895,867
METHOD OF AND APPARATUS FOR REMOVING FROM A MANDREL, BY
MEANS OF COMPRESSED AIR, FIBRO-CEMENT TUBES PRODUCED
WITH TUBE-MAKING MACHINES AND THE LIKE
Filed May 16, 1956

United States Patent Office 2,895,867
Patented July 21, 1959

2,895,867

METHOD OF AND APPARATUS FOR REMOVING FROM A MANDREL, BY MEANS OF COMPRESSED AIR, FIBROCEMENT TUBES PRODUCED WITH TUBE-MAKING MACHINES AND THE LIKE

Robert Fourmanoit, Genoa, Italy, assignor to Eternit Soc. p. Az., Genoa, Italy

Application May 16, 1956, Serial No. 585,338

Claims priority, application Italy June 17, 1955

1 Claim. (Cl. 162—118)

Systems are known which have been adopted for the production of fibro-cement tubes on tube-making machines or the like for the purpose of effecting removal of the mandrel, that is to say the detaching of the tube as soon as it has been formed by the mandrel on which the tube itself was wrapped.

This operation of mandrel removal is generally carried out either on the actual machine making the tubes, by stopping the manufacture of the tube a little before the final thickness is obtained, or with an accessory calendering machine, and proceeds in the following manner:

The tube being stopped, there is introduced between the tube and the mandrel in correspondence with the ends and with the two sides a suitable tool in the form of a pin (ordinary or carrying compressed air) so as to cause a detachment, although localized, and the beginning of an air penetration.

When the tool is extracted, the tube is again turned, compressing it between the rollers of the machine forming the tubes or of the accessory calenderer. In such manner, the partial detachment effected previously at the ends spreads over the entire tube and the latter becomes completely detached from the mandrel, from which it can then easily be removed.

This method has various disadvantagges however, particularly:

If the mandrel removal is made on the same production machine each tube produced entails an interruption in operation, a stoppage moreover with consequent loss of production, and increased mechanical wear owing to the successive mandrel startings, and so on.

Since the detaching effect is obtained progressively from the ends towards the half of the tube, it is obvious that, when the operation is terminated, the ends will be wider and more elaborate than the middle part, that is to say that the tube will be of better quality and regular diameter at the center and of poorer quality and larger diameter at the ends.

It is obvious that although air is the most suitable fluid—from various aspects—for effecting the mandrel removal, any other suitable fluid could be used; in what follows and in the claim, reference will be made to air as mandrel removal fluid solely by way of non-limiting example.

The subjects of the present invention are a method and the apparatus by means of which, without the necessity of introducing pins or any tools and solely by the emission of air, the tube is uniformly detached from the mandrel, this detachment taking place uniformly and simultaneously over the entire length of the successive inside generatrices of the tube.

According to the invention, the method of removing fibro-cement tubes made on tube-making machines from the mandrel by means of compressed air is characterized by the fact that the air required for the mandrel removal is applied between the surface of contact of the mandrel and the tube at a plurality of points which are preferably distributed along a generatrix of the mandrel, said air being conducted to these points through the wall of the mandrel substantially when the winding of the tube is finished, after which, by means of the subsequent rotation of the mandrel by one or a plurality of turns, the said air is obliged to flow owing to the actual operation of the winding machine or by the action of an additional calenderer, on the outside surface of the mandrel, thus effecting the detachment of the tube from the mandrel.

The above described process is further characterized by an inner cavity of the mandrel having the said holes, this cavity serving as a supply duct for the holes of the air for the mandrel removal, and by means which prevent air being brought into the said holes during the winding of the continuous layer or band with which the tube is formed, for the purpose of avoiding an anticipated and spontaneous calendering action, while said cavity is put under pressure only at the moment at which it is desired that mandrel removal should begin.

The apparatus for putting the above process into effect is characterized by the fact that the mandrel for spirally winding the continuous band of fibrocement material is provided with a number of small holes distributed along a line, such as a generatrix, of the surface of contact of the mandrel, the said holes being in communication with a conduit by means of which, at the desired moment, air under pressure is applied between the outer surface of contact of the mandrel and the inner surface of the wound tube.

The apparatus is further characterized by the fact that the conduit has reduced dimensions and/or means such as to prevent air being able to arrive between the winding surface of the mandrel and the tube before this is desired for the mandrel removal.

The apparatus is further characterized by the fact that the feeding conduit for supplying air to the small holes is of reduced cross-section and is provided at one of its ends with a shut-off means which prevents the arrival of air until the moment it is desired to effect the mandrel removal, or else with a means capable of producing a depression inside the said conduit.

The apparatus is characterized in particular, in one of its embodiments, by the fact that the conduit is prearranged in the thickness of the tube constituting the mandrel.

In another embodiment, the apparatus is characterized by the fact that the mandrel constituted by a metal tube having a thin wall and an outer surface worked with the customary required precision contains a filling material, such as wood or another material, having a small longitudinal peripheral longitudinal passage for supplying the holes with air.

In the accompanying sheet of drawings, one preferred embodiment of the device and other means of constructing the same are shown by way of example. Figure 1 is a longitudinal section of the mandrel and Figure 2 is a vertical cross-section of said mandrel, while Figures 3 and 4 show two similar sections for other embodiments.

Figure 2:
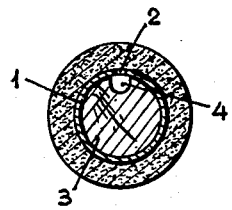

With reference to Figures 1 and 2, the hollow mandrel 1 has the form of an iron tube with a thin wall, and has a row of small holes 2; 3 is a filling material (of wood) for the cavity of the mandrel; the said filling has a small passage 4 disposed in correspondence with the small holes 2; the small passage 4 is closed at one of its ends 5 and at the other end 6 is connected to a pipe 7 for supplying air under pressure; the said pipe is connected, by a rotary seal joint 9, to the inlet pipe 10 of the air under pressure; in the said pipe there is a shut-off means 8 which can be controlled by hand.

Figure 3:
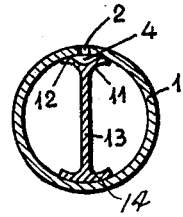
Figure 4:
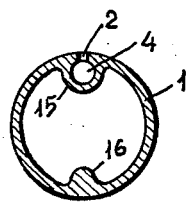

Figure 3 shows a mandrel 1 identical to that shown in

Figures 1 and 2, and a small passage 4 obtained by means of a gutter 11 with shaped edges 12, the said gutter being carried by a diaphragm 13 having a foot 14 at the other end, the whole being adapted and shaped in such manner that, after heating and consequent expansion of the tube 1, the assembly 11 and 14 can be introduced in a position such that the small passage corresponding to the holes 2 and the cooling of the pipe 1 locks the assembly 11 and 14 in the desired position.

Figure 4 shows an embodiment in which the mandrel 1 has in correspondence with rows of holes 2 a rib 15 containing the small passage 4 in communication with the holes 2; if necessary, the mandrel can be provided with a balancing rib 16.

The above indicated features 7–10 are also found in the embodiments shown in Figures 3 and 4.

The process of mandrel removal proceeds in the following manner: after the tube has been substantially completely wound, while the device 8 is closed, the said device 8 is then opened and small amounts of air are allowed to penetrate in correspondence with the holes 2 between the said outer winding surface of the mandrel and the inner surface of the tube. During the successive rotation of the mandrel with the tube, the said air will be compelled to move from one generatrix to the next of the said surfaces, thus effecting the detachment of the tube from the mandrel while avoiding the previously indicated drawbacks.

The operation may be carried out either with the mandrel on the actual winding machine or on the mandrel transported on an additional calenderer.

Although for descriptive reasons the present invention has been based on the above description and illustration, several modifications and additions may be made to the embodying of the invention, all of which are based on conceptions of the invention as summarized in the claim.

What I claim is:

A process for removing a fibro-cement tube from a mandrel upon which it has been formed which comprises the steps of introducing from the interior of the mandrel a plurality of streams of air under superatmospheric pressure between the outer surface of the mandrel and the interior surface of the fibro-cement tube to form an elongated sheet of said air extending longitudinally of said fibro-cement tube, rotating said mandrel, and applying rolling pressure to the exterior surface of said fibro-cement tube as the mandrel rotates.

References Cited in the file of this patent

UNITED STATES PATENTS

| Number | Name | Date |
|---|---|---|
| 191,618 | Slayton | June 5, 1877 |
| 1,072,011 | Keyes | Sept. 2, 1913 |
| 1,150,636 | Sheehan | Aug. 17, 1915 |
| 1,123,322 | Lancey | Jan. 5, 1915 |
| 1,225,778 | Cram et al. | May 15, 1917 |
| 1,234,701 | Parker | July 24, 1917 |
| 2,430,411 | Rembert | Nov. 4, 1947 |